(12) United States Patent
Arnoul et al.

(10) Patent No.: US 6,594,600 B1
(45) Date of Patent: Jul. 15, 2003

(54) METHOD FOR CALIBRATING THE INITIAL POSITION AND THE ORIENTATION OF ONE OR SEVERAL MOBILE CAMERAS

(75) Inventors: Patrick Arnoul, Dampierre (FR); Jean-Pierre Guerin, Orsay (FR); Laurent Letellier, Fontenay-Aux-Roses (FR); marc Viala, Guyancoart (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/331,112
(22) PCT Filed: Oct. 23, 1998
(86) PCT No.: PCT/FR98/02270
§ 371 (c)(1),
(2), (4) Date: Jul. 13, 1999
(87) PCT Pub. No.: WO99/22281
PCT Pub. Date: May 6, 1999

(30) Foreign Application Priority Data

Oct. 24, 1997 (FR) .............................. 97 13375

(51) Int. Cl.⁷ .......................... G01P 21/00; G06F 15/00
(52) U.S. Cl. .......................... 702/94; 702/150; 382/154
(58) Field of Search .............................. 702/85, 91, 92, 702/94, 95, 127, 150–153, 97, 158, 159, 183; 33/203.18, 286, 288; 382/151, 154; 348/135, 137, 141, 148

(56) References Cited

U.S. PATENT DOCUMENTS

| | | | | |
|---|---|---|---|---|
| 4,396,942 A | * | 8/1983 | Gates | 348/135 |
| 4,753,569 A | * | 6/1988 | Pryor | 700/250 |
| 4,831,549 A | * | 5/1989 | Red et al. | 700/254 |

FOREIGN PATENT DOCUMENTS

| | | |
|---|---|---|
| FR | 2 749 419 | 12/1997 |
| FR | 2 760 277 | 9/1998 |
| WO | WO 94/29774 | 12/1994 |

OTHER PUBLICATIONS

Dementhon, et al., "Model–Based Object Pose in 25 Lines of Code", International Journal of Computer Visions, vol. 15, pp. 123–141 (1995).

Abidi, et al., "Pose Estimation For Camera Calibration and Landmark Tracking", Proceedings of 1990 IEEE International Conference on Robotics and Automation, pp. 420–426 (May 13–18, 1990).

Oberkampf, et al., "Iterative Pose Estimation Using Coplanar Feature Points", Computer Vision and Image Understanding, vol. 63, pp. 495–511 (1996).

Horaud, et al., "An Analytic Solution For The Perspective 4–Point Problem", Computer Vision, Graphics and Image Processing, vol. 47 pp. 33–44 (Jul. 1989).

He, et al., "Stereo Camera System Calibration with Relative Orientation Constraints", SPIE, vol. 1820, Videometrics, 8 pages (1992).

*Primary Examiner*—Marc S. Hoff
*Assistant Examiner*—Manuel L. Barbee
(74) *Attorney, Agent, or Firm*—Thelen Reid & Priest LLP; Robert E. Krebs

(57) ABSTRACT

A method of calibrating a camera (4, 22) disposed on a mobile support (21). The camera takes an image of a test object formed of at least three marks appearing in the field of the camera, and analysis of the image gives the initial position and orientation of the camera with respect to that of the test object, which are known in an application. The support (21) can then be moved towards an object (28) of which the camera takes images. As the movements of the support are measured accurately, analysis of the images of the object gives the precise position and orientation of the object with respect to the camera and with respect to the test object. One application is the recording of road signs (28) in order to compose databases for network management or for an on-board navigation system.

4 Claims, 6 Drawing Sheets

U.S. PATENT DOCUMENTS

| | | | | |
|---|---|---|---|---|
| 4,831,561 A | * | 5/1989 | Utsumi | 702/150 |
| 4,893,183 A | * | 1/1990 | Nayar | 348/135 |
| 5,073,819 A | * | 12/1991 | Gates et al. | 348/140 |
| 5,285,397 A | | 2/1994 | Heier et al. | |
| 5,489,979 A | * | 2/1996 | Corghi | 356/139.09 |
| 5,530,420 A | * | 6/1996 | Tsuchiya et al. | 340/435 |
| 5,784,282 A | * | 7/1998 | Abitbol et al. | 700/186 |
| 6,310,644 B1 | * | 10/2001 | Keightley | 348/159 |
| 6,349,245 B1 | * | 2/2002 | Finlay | 700/245 |
| 2002/0027651 A1 | * | 3/2002 | Jackson et al. | 356/139.09 |

* cited by examiner

METHOD FOR CALIBRATING THE INITIAL POSITION AND THE ORIENTATION OF ONE OR SEVERAL MOBILE CAMERAS

FIELD OF THE INVENTION

The invention relates to a method of calibrating the original position and orientation of one or more mobile cameras and its application to the three-dimensional positional measurement of fixed objects.

It can find various applications for automatic calculation of the position of objects by taking at least one image of these objects with the camera and calculating their position according to their track on the images taken and the position of the camera.

DESCRIPTION OF RELATED ART

The French patent 96 06749, not yet published, describes such an application, and the corresponding hardware system, for which the invention would be of use: it concerns the automatic recording of traffic signs along a road: one or more cameras are fixed on the roof of the vehicle, which may also be provided with an inertial navigation unit and equipment with an antenna for location with respect to a constellation of satellites in orbit (for example a GPS system); the second of these two instruments periodically (a few seconds) gives the position of the vehicle on the surface of the Earth and its course with very great accuracy, and the first one is used for updating the position and orientation information between the location times. The camera takes a series of images of each sign the vehicle passes, and an image processing system attached to the camera, which comprises means of carrying out Kalman filtering of a characteristic point of each object on each of the images, supplies coordinates representing the direction and distance of the object with respect to the camera on each of the images by means of an algorithm for predicting, checking and estimating the track of the characteristic point of the object on each image. There are also simpler algorithms, based on a triangulation from positions of characteristic points of the object on two or more images. The position of the object can therefore be determined using this information and the available knowledge concerning the position and orientation of the camera and the vehicle. The position and orientation of the vehicle are known at any instant in a fixed reference frame (related to the Earth) by virtue of the satellite location system and the inertial unit, but the position and especially the orientation of the camera with respect to the vehicle remain to be calibrated.

Two means of overcoming the uncertainties of positioning the camera on the mobile support which transports it have been proposed: assembling the camera on the support by means of a mechanical device which offers great accuracy, or providing the camera case with reference points, fixing it to the support by means of a mechanism making it possible to adjust its position, and performing a positional adjustment between the camera reference points and fixed reference points in order to align the camera viewfinder with a given direction on the support. The first possibility of this alternative requires expensive mechanical means which do not allow setting of the position of the camera on the support nor carrying out of any positional setting of any sort whatsoever, and the replacement of the camera becomes difficult or impossible since the mechanical system is adapted to each camera model. The other possibility of the alternative requires the camera to be is calibrated in the laboratory so that its reference points are tracked correctly according to the direction of the viewfinder, and precludes changing the positional settings of the camera subsequently otherwise the calibration procedure will have to be started again in order to obtain new reference points.

BRIEF SUMMARY OF THE INVENTION

The advantage of the invention is essentially to escape this requirement of placing the camera on the mobile support with great accuracy in order to properly measure the position and especially the orientation of the object viewed. It also makes it possible to easily use a number of cameras on the same mobile support.

A number of advantages follow from this characteristic. It is first of all unnecessary to finely set the position at which the camera is fixed to the support, and it is possible to re-orient the camera without difficulty for a new application of the method if so desired. It is also possible, without any drawback, to mount the camera on a mobile, notably rotary, turret mounted on the support, despite the additional positional and orientational uncertainty which is then introduced; it is necessary simply to accurately measure the movements of the turret, without having to accurately know its original position and orientation; these will be determined implicitly by the method of the invention. Such a turret could for example be used in the sign recording application to facilitate the taking of successive images in places such as roundabouts where the direction of the vehicle and the field of view of the camera move very quickly.

The characteristic measurement of the invention consists in taking, for each camera, a preliminary image of a test object whose position is known in the environment; to that end, the vehicle will be moved for each camera: analysis of the image of the test object provides the position and orientation of the camera and its support with respect to the test object and therefore in a fixed reference frame. It is then sufficient to take successive images of the object which are analyzed in their turn by one of the known methods in order to know the position of the object in the fixed reference frame, by measuring the movements of the support up to each of the places where an image is taken and deducing the position of the object with the help of its track on each of the images.

It should be noted that the position and orientation of the mobile support are known at each instant including at the time the images of time test object are taken.

Where the object to be located carries a number of well identified relative position reference marks, a method of location from a single image of the object can be used.

To summarize, the invention relates in its most general form to a method of calibrating the original position and orientation of one or more cameras, disposed on a mobile support in an environment, characterised in that it consists in providing the environment with a test object at a known position and orientation; in taking an image of the test object with each camera and in analyzing the image of the test object with a processing system by reading positions of tracks of characteristic points of the test object on the image and deducing directions and distances between the characteristic points and the camera, and then a position and an orientation of the camera with respect to the test object; or, in a scarcely different design, it concerns a method of calibrating, with respect to a second camera, the original position and orientation of a first camera disposed on a mobile support in an environment, characterised in that it consists in providing the first camera with a calibration camera and the second camera with a test object at a known position and orientation; in taking an image of the test object with the calibration camera; and in analyzing the image of the test object with a processing system by reading positions of tracks of characteristic marks of the test object on the image and deducing directions and distances between the characteristic marks and the calibration camera, then a position and an orientation of the calibration camera with respect to the test object, and then of the first camera with respect to the second camera.

Advantageously, the test object comprises at least three marks appearing in the field of the camera; it has advantageously a larger number of non-coplanar marks.

The invention also relates to a method of three-dimensional positional measurement of fixed objects by means of one or more cameras mounted on a mobile support, characterised in that it consists, after having applied the calibration method, in subjecting the support to a movement up to the object while measuring this movement; in taking images of the object with the camera or cameras, between each of which the support is again moved; of analyzing the images of the object with the processing system in order to deduce therefrom a direction and a distance between the object and the camera or cameras; and finally in calculating the position of the object by using the said direction and the said distance between the object and the camera and the movements of the support.

The invention will now be described in detail with the help of he following figures:

BRIEF DESCRIPTION OF THE SEVERAL VIEWS OF THE DRAWING(S)

DETAILED DESCRIPTION OF THE INVENTION

Figure 1:
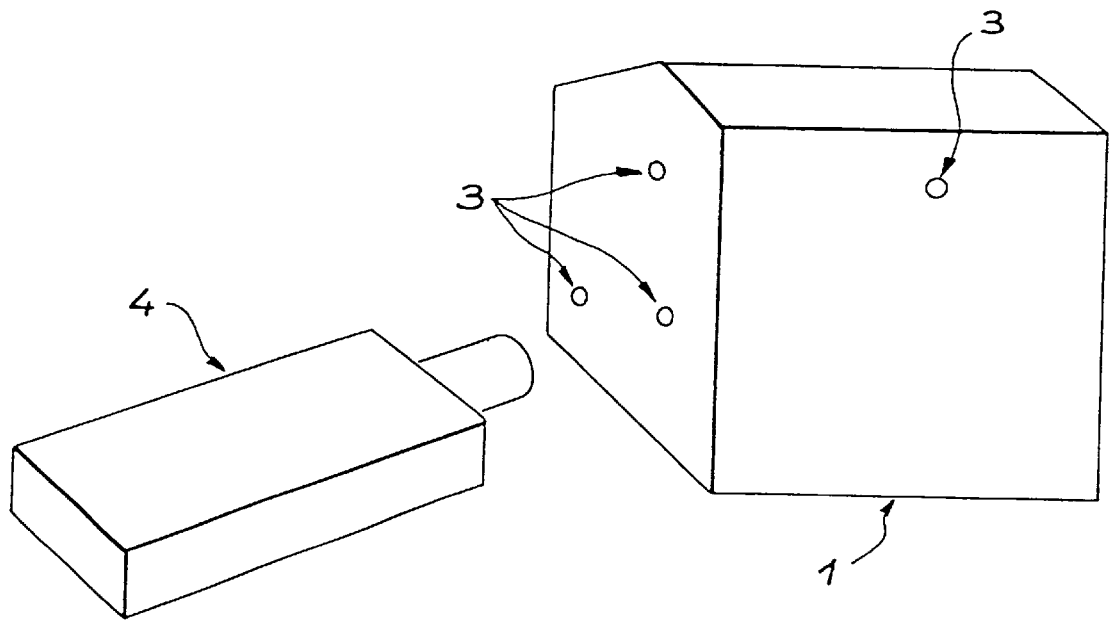
FIG. 1 is a schematic and general view of the elements which play a part in the location of the initial position and orientation of the camera with the help of a test object.

It should be noted first of all that the appearance of an object viewed by the camera depends on eleven parameters: the six extrinsic parameters of the camera, that is to say its coordinates of orientation and position with respect to the object and at least five intrinsic parameters, namely two coordinates which define the position of the optical centre on the camera sensor, two values which take account of the focal distance of the objective and at least one radial distortion factor. These intrinsic parameters can be determined by known calibrations which are performed as soon as the elements of the camera have been assembled; they then remain invariable. The location of the camera, the object of the invention, is in reality linked to the determination of its extrinsic parameters. It must be carried out when the camera is mounted on its support, each time it is taken down and remounted or its position is adjusted on the support, and in practice from time to time. A fixed test object is used for this. The method of calculating the extrinsic parameters is detailed below.

The monocular location used for obtaining the extrinsic parameters of a camera in this method is based on the use of a test object of known dimensions and a single image taken by the camera representing this test object. Certain known resolution methods are analytical and necessitate the solving of a system of non-linear equations in order to determine the positions of reference points or marks of the test object for their image. They are fast but sensitive to measurement noise and require a larger number of identification marks.

Another category is constituted by iterative solutions, in which the position of the reference points is estimated and then corrected in order to minimize an error criterion between the images recorded by the camera and the images which would be obtained with the estimated position of the reference points. These solutions are accurate, not very sensitive to measurement noise and make it possible to use a variable number of reference points, but they have the drawback that convergence can be quite slow and that the first estimate must be close to the solution, failing which convergence is no longer assured.

An inverse device for location of an object carrying reference marks is described in the article "Model-based object pose in 25 lines of code" by DeMenthon and Davis, published in International Journal of Computer Vision, vol. 15, p.123–141, 1995, and consists in obtaining a first analytical estimate of the position of the reference points by an algorithm which is approximate but simple to use, and then in correcting this initial positional estimate by an iterative process in which the positional estimates of the reference points are projected on to the image taken by the camera before applying the approximate algorithm to these projections in order to give new positional estimates of the reference points which are more accurate than the previous ones.

A location method is proposed here which belongs to the monocular optical method family and comprises the use of an iterative solution method using a first position-estimating algorithm very similar to this article; this method is distinguished from the previous one in particular by a better final estimation algorithm, less sensitive to measurement noise, by a particular step of improving the determination of the position of the reference points on the image, as well as by a nature of the reference points which makes it possible to satisfy the accuracy requirement in the final determination of the position of the image.

The final three-dimensional estimation algorithm is implemented with the help of a non-linear least squares calculation with injection of quality factors originating from the step of improving the two-dimensional position of the tracks of the marks in the image. This calculation could advantageously be replaced by a Kalman filter whose numerical stability is assured with single-precision (32-bit) floating point operations. The non-linear least squares calculation necessitates double-precision (64-bit) operations which are not available on all computer hardware, notably on-board systems with DSP (Digital Signal Processing Processor).

It should be noted that the French patent application 97 02426, not yet published, describes a method similar to this one for determining the position and orientation of mobile objects, carrying reference marks, in the field of vision of a camera Which is fixed and of known position.

FIG. 1 depicts a test object 1 which carries marks 3 on two plane faces forming a dihedron and turned towards a camera 4; the marks 3 may consist of patterns of small surface area such as points of colour or those which reflect the surrounding light. These patterns are advantageously greater than three in number and non-coplanar, but an additional step of initializing the three-dimensional location with values a priori makes it possible to have recourse only to three reference marks by removing the ambiguities which may appear This is because, in the high-precision three-dimensional location applications which can be dealt with within the scope of this patent, very often good values coming close to the final result are known which allow initialization of the process. The patterns are moreover advantageously even more numerous if it is wished to obtain better accuracy. It is not essential that the marks 3 are at a defined and unchanging orientation with respect to the camera 4, but they can on the contrary be presented obliquely to it without the detection accuracy being compromised, which does not necessitate the camera 4 being placed with too many constraints.

These passive marks can be preferred to the luminous marks, generally used in the art and which are more easily visible but whose outlines are less distinct, which precludes properly benefiting from the positional estimation improvement algorithm described later.

Figure 2:
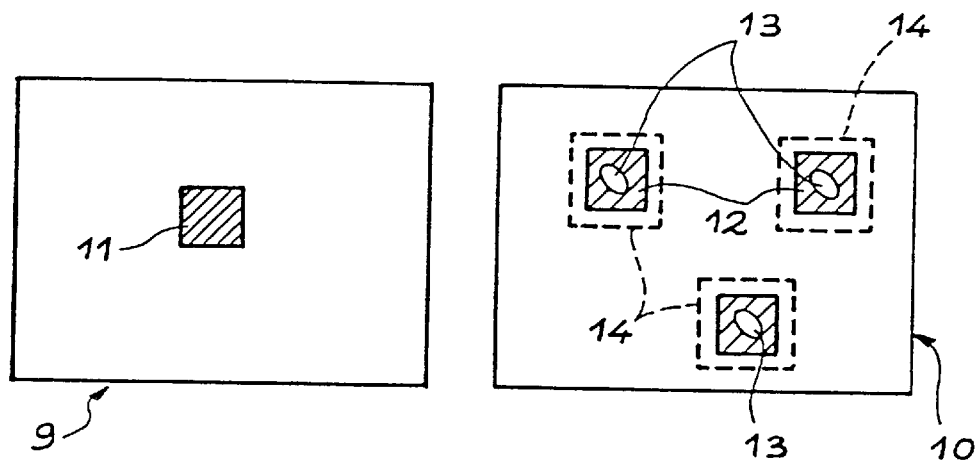
FIG. 2 illustrates the technique of searching for tracks of the marks of the test object on the image taken by the camera.

The first step of the location method consists of searching for the track of the marks 3 on the image taken by the camera 4. It is a step of identifying sub-images or image portions each containing the track of one of the marks 3. FIG. 2 shows that the procedure involves a correlation of the image 10 of the camera 4 with a calibration image 9 taken previously. If it was noted that the track of one of the marks 3 was included within the area of a reference portion or sub-image 11 of the calibration image 9, the location program successively creates sub-images 12 of identical area at coordinates x and y on the image 10 and calculates the correlation C of the light intensity of the points of the sub-images 11 and 12 according to the following formula (1):

$$C(x, y) = \frac{\text{Cov}(M_0, M_k)}{\sigma(M_0)\sigma(M_k)} \qquad (1)$$
$$= \frac{E(M_0 M_k) - E(M_0)E(M_k)}{\sqrt{E(M_0^2) - E(M_0)^2}\sqrt{E(M_k^2) - E(M_k)^2}}$$

where Cov is the covariance, E is the expected value and $\sigma$ the standard deviation or the light intensity. $M_0$ and $M_x$ represent the contents or light patterns of the sub-images 11 and 12. This calculation is repeated for all positions of the sub-image 12 bay varying x and y. A correlation table of the image 10 is then obtained, whose points are assigned a number between −1 and +1, where −1 represents an anti-correlation between the patterns $M_0$ and $M_x$ for the coordinates x and y under consideration, 0 lack of correlation and +1 a perfect correlation This last situation appears when the sub-image 12 is identical to the reference sub-image 11: the correlation serves precisely to pick out one places of best correlation with the sub-image 11 on the image 10 by means or reading the correlation table; it is then possible to isolate a certain number of sub-images 12 in the image 10, which each contain the track 13 of one of the marks 3 of the object viewed. There may be only one reference sub-image 11 for a number of sub-images 12 if the marks 3 are identical; otherwise, one sub-image 12 is associated with one respective reference sub-image 11.

This method has the great advantage of making it possible to find the tracks of the marks 3 even when light variations exist between the marks 3 or between the image 10 and the calibration image 9.

Certain precautions must however be taken to make the method more advantageous and more reliable. It is necessary in fact to accept that these correlation calculations are long and expensive. This is why they are undertaken in reality on reduced images, having simply a selection of points (pixels) of the original image. From the reduced correlation table thus obtained, the points corresponding to candidate sub-images are selected in a greater number than the sub-images 12 which are sought. The candidate sub-images are subject to a second selection by carrying out a check correlation on complete candidate sub-images, that is to say those into which all the points removed in constructing the reduced image have been re-integrated. The sub-images 12 finally adopted are those which have the best check correlation with the reference sub-image 11. These precautions make it possible to protect against the risks of error attached to real operating conditions, where stray lights or other artefacts may lead the system into error and induce it to identify tracks 13 at these places rather than at the true ones. Moreover, the check correlations can be calculated a number of times for each of the sub-images 12, moving them each time within the area of a window 14 of predetermined dimensions constructed around each of the candidate sub-images. It is of course the position of best correlation in the window 14 which is adopted for defining the sub-image 12. The risk of truncating the track 13 by centring it incorrectly in the sub-image 12 is then greatly reduced.

One important, although optional, element of the invention consists of estimating with great precision the position of the tracks 13 of the marks 3 on the sub-images 12: the method which is proposed makes it possible to perform a sub-pixel location of this position, that is to say one with a precision better than the width of one point of the image. It is then possible to obtain satisfactory location results, even with a less expensive, low-resolution camera 4, whose images are utilized more quickly. It would be possible to use as a basis the calculation of correlation between the sub-image 12 of the track 13 and a primitive image such as the sub-image 11 in order, for example, to calculate the position of the centre of the track 13 on the sub-image 12. But this kind of method becomes ineffective when the test object 1 is seen at an incidence other than during the calibration image taking, which distorts them on the sub-image 12. This is why modelling the tracks 13 on the sub-image 12 by a formula such as the following (2) is proposed:

$$I(x, y) = a + bx + cy + \qquad (2)$$
$$d\exp\left(\frac{1}{2(1 - r_{xy}^2)}\left(\frac{(x - m_x)^2}{\sigma_x^2} + \frac{(y - m_y)^2}{\sigma_y^2}\right.\right.$$
$$\left.\left. - \frac{(x - m_x)(y - m_y)}{\sigma_x \sigma_y}\right)\right)$$

where I is the light intensity on the sub-image 12, a, b, c and d are constants, the first three of which serve to estimate the light intensity of the background of the sub-image 12, the last, the overall light intensity of the track 13; $m_x, m_y$ express the coordinates of the centre of the track 13, $\sigma_x$ and $\sigma_y$ its widths in main axes which can be oblique (by an angle $\theta$) with respect to the main axes of the sub-image 12, and $r_{xy}$ expresses the spread of the track.

Figure 3:
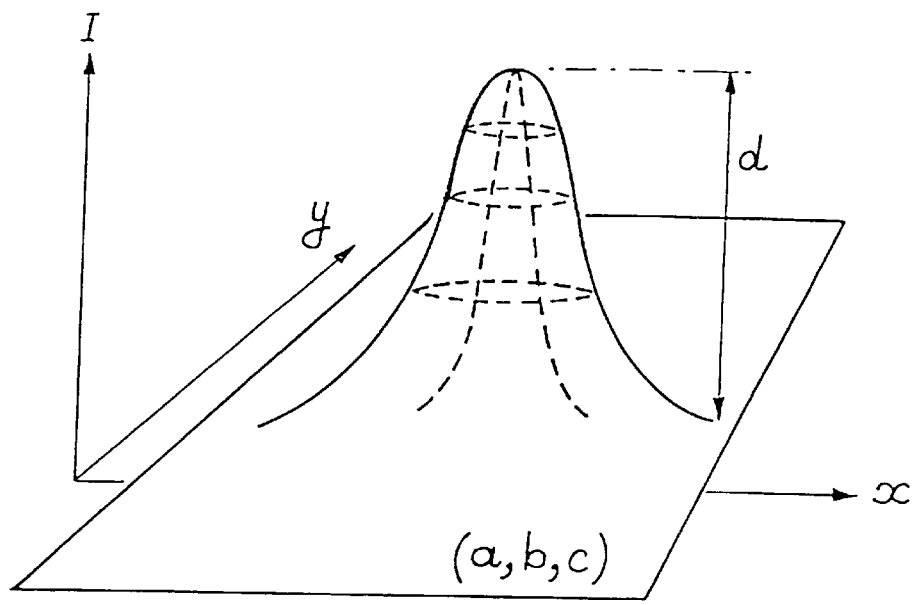
FIGS. 3 and 4 illustrate a modelling of a track of a mark on the image.
Figure 4:
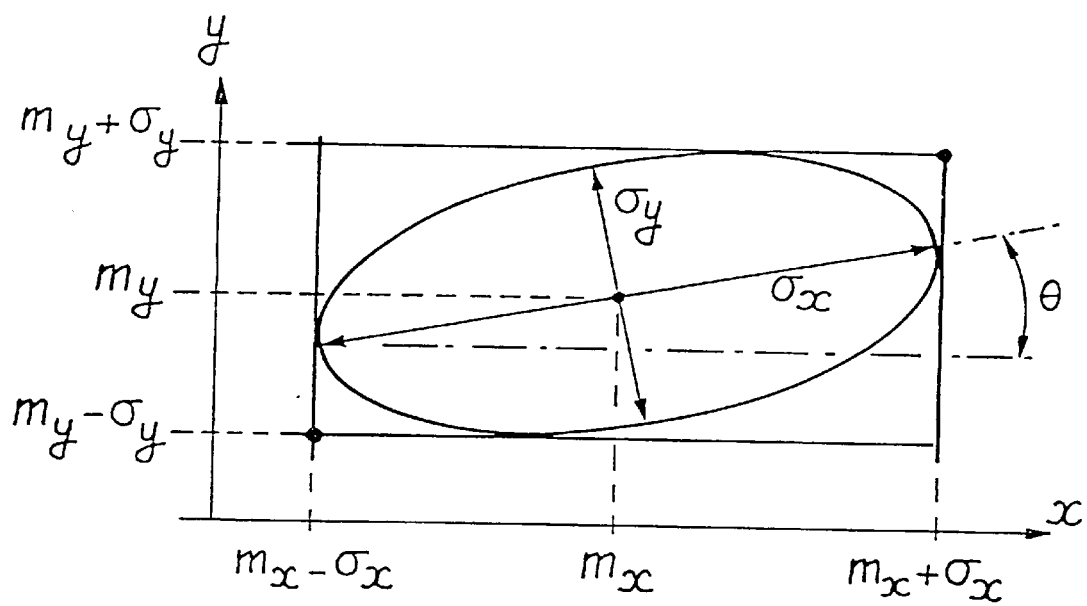

From a mathematical point of view, a, b and c are coefficients of a plane and d the height of a Gaussian function of elliptical two-dimensional section of which $m_x$ and $m_y$ are the means, $\sigma_x$ and $\sigma_y$ the standard deviations and $r_{xy}$ the correlation. FIGS. 3 and 4 give a graphic representation thereof.

It may be seen that this model takes into account the narrowing of the track 13 on the sub-image 12 as a result of the mark 3 moving away and its distortion as a result of the obliqueness of the test object 1. If the light intensity measured on the points the sub-image 12 is referred to as $I_{(xy)}$, the task consists of minimizing the function $C_{min}$ of the formula (3):

$$C_{\min}(a, b, c, d, m_x, m_y, \sigma_x, \sigma_y, r_{xy}) = \sum_{x,y \in I} (I(x, y) - \hat{I}(x, y))^2 \quad (3)$$

by varying the variables of this function, that is to say the modelling parameters, so that the light intensities given by it best coincide with the measured values. A precise modelling of the track 13 is then obtained: in particular a deduction can be made therefrom of the centre by the values of $m_x$ and $m_y$ and consequently, with a known preliminary calibration of the camera 4, of the direction of the mark 3 associated with the sub-image 12 under consideration with respect to the camera 4.

The model given previously is suitable for is circular marks 3, but it is easy to transpose it to different marks of simple form.

Figure 5:
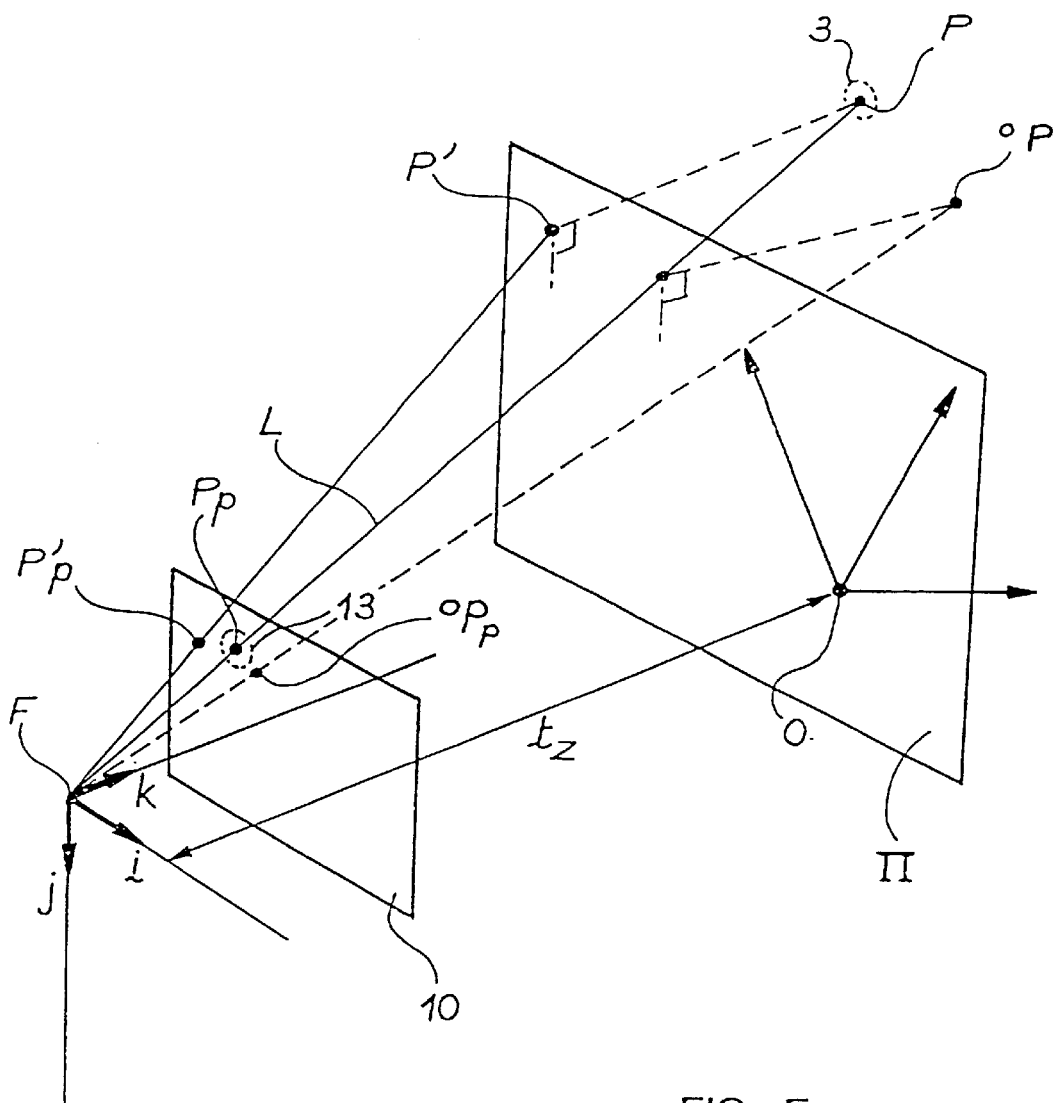
FIG. 5 is a geometric representation explaining the method of location and orientation of the camera.

It now remains to determine the position oF the camera 4 with respect to the marks 3. FIG. 5 will make it possible to understand the explanations which follow.

Assuming that the geometric distortions caused by the objective of the camera 4 have been corrected notably by the radial distortion factor of the intrinsic parameters of the camera, which can also be done by a preliminary calibration of the camera 4 by photogrammetry, the point P at the centre of a mark 3 is situated on a projection line L passing through the centre Pp of the corresponding track 13 on the image 10 and through a focus F. The axes of a reference frame of a camera whose focus F is the origin are referred to as i, j and k, the axis k being perpendicular to the image 10. All the points of the space perceived by the camera 4 are projected on to the image 10 by a line passing through the focus F: this convergent projection is referred to as "perspective". The position of the points Pp, the centres of the tracks 13, can therefore be predicted when the test object 1 occupies a given position in the field of the camera 4; the problem consists of finding the retro-projection relationships which make points Pp change to the points P. However, it should be noted that the rigorous retro-projection relationships, obtained by inverting the projection relationships making it possible to calculate the coordinates of the points Pp from the coordinates of the points P, cannot be utilized easily since they do not consist of a system of linear equations.

This is why having recourse to a first evaluation of the position of the points P is recommended; this first evaluation is approximate but it can be obtained easily and then makes it possible to apply a method of convergence towards the real solution. The principle adopted consists of assuming that the points P are projected on to the image 10 in two steps, first by an orthogonal projection on to an intermediate plane Π parallel to the plane of the image 10, at a point P', then by a perspective projection of this point P' towards the focus F, which gives a point Pp' on the image 10. This false projection point is close to the true projection point Pp. The first evaluation of the position of the points P consists of applying a retro-projection, the inverse of the false projection which has just been described, to the points Pp of the image 10: the points thus obtained are denoted by °P.

This principle being disclosed, it is necessary to detail more precisely the calculations undertaken.

The situation of the test object 1 can be represented by a rotation R and a translation t in accordance with the following matrices (4), which cause a change from the reference frame of the video camera 4, defined above, to a fixed reference frame, related to the test object 1:

$$t = (t_x, t_y, t_z)^T$$

$$R = \begin{pmatrix} i_x & i_y & i_z \\ j_x & j_y & j_z \\ k_x & k_y & k_z \end{pmatrix} = \begin{pmatrix} i^T \\ j^T \\ k^T \end{pmatrix} \quad (4)$$

where $t_x$, $t_y$, and $t_z$ are translation coordinates expressed in the axes i, j and k of the reference frame of the camera 4 and i, j and k are the base vectors of the reference frame of the camera 4 expressed in the reference frame of the test object 1.

The plane Π is chosen such that the origin O or the reference frame of the test object 1 is a member thereof, which implies that the focus F is at a magnitude $t_z$ away from the plane π.

If the coordinates of the point P in the reference frame of the test object 1 are referred to as $°_x$, $°_y$ and $°_z$ and the coordinates of the point P'p on the image 10 are referred to as $\bar{u}$ and $\bar{v}$, the following relationships (5) can be obtained:

$$\frac{i \cdot (°x, °y, °z)^T + t_x}{t_z} = \bar{u} \qquad \frac{j \cdot (°x, °y, °z)^T + t_y}{t_z} = \bar{v} \quad (5)$$

These equations can be generalized to a number n of points P of the test object 1 in the following manner (6):

$$A \begin{pmatrix} I_1 \\ I_2 \\ I_3 \\ I_4 \end{pmatrix} = \bar{u} \qquad A \begin{pmatrix} J_1 \\ J_2 \\ J_3 \\ J_4 \end{pmatrix} = \bar{v} \quad (6)$$

where the notations I, J, A, $\bar{u}$, $\bar{v}$ are given by the equations here (7):

$$\begin{cases} I_1 = i_x / t_z \\ I_2 = i_y / t_z \\ I_3 = i_z / t_z \\ I_4 = t_x / t_z \\ J_1 = j_x / t_z \\ J_2 = j_y / t_z \\ J_3 = j_z / t_z \\ J_4 = t_y / t_z \end{cases} \quad (7)$$

$$A = \begin{pmatrix} °x_1 & °y_1 & °z_1 & 1 \\ \vdots & \vdots & \vdots & \vdots \\ °x_n & °y_n & °z_n & 1 \end{pmatrix} \qquad \bar{u} = \begin{pmatrix} \bar{u}_1 \\ \vdots \\ \bar{u}_n \end{pmatrix} \qquad \bar{v} = \begin{pmatrix} \bar{v}_1 \\ \vdots \\ \bar{v}_n \end{pmatrix}$$

It is then a question of calculating the quantities $I_n$ and $J_n$, which is carried out by the following formulae (8):

$$\begin{pmatrix} I_1 \\ I_2 \\ I_3 \\ I_4 \end{pmatrix} = B\bar{u}' \qquad \begin{pmatrix} J_1 \\ J_2 \\ J_3 \\ J_4 \end{pmatrix} = B\bar{v}' \qquad (8)$$

where the matrix B is the pseudo-inverse of A, that is to say $B = (A^T A)^{-1} A^T$.

Calculation of the parameters i, j, k and $t_x$, $t_y$, $t_z$ of the matrices R and t is then carried out simply by the sequence of following steps:

calculation of the norms $n_1 = \|(I_1, I_2, I_3)^T\|$ and $n_j = \|(J_1, J_2, J_3)^T\|$;

calculation of the mean norm $n = (n_I + n_J)/2$;

calculation of $i = (I_1, I_2, I_3)^T / n_I$ and $j = (J_1, J_2, J_3)^T / n_J$;

calculation of k by the vector product of the vectors i and j;

calculation of the component $t_z = 1/n$;

calculation of $t_x = I_4 t_z$ and $t_y = J_4 t_z$.

When the position of the points °P estimating the position of the points P has thus been obtained by these calculations, it should be corrected owing to the error of principle explained with the remarks concerning FIG. 5. The points °P are projected on to the plane of the image 10 along a line directed towards the focus F. The coordinates ¯u and ¯v of the projection point °Pp are given by the formulae (9):

$$\frac{i \cdot (°x, °y, °z)^T + t_x}{k \cdot (°x, °y, °z)^T + t_z} = \hat{\bar{u}} \qquad \frac{j \cdot (°x, °y, °z)^T + t_y}{k \cdot (°x, °y, °z)^T + t_z} = \hat{\bar{v}} \qquad (9)$$

to be compared with the similar but simpler preceding formulae (5).

The final estimate of the location parameters of the test object 1, that is to say the values of coefficients of the matrices P end t which give the position and orientation of the reference frame of the test object 1, is obtained by minimizing the quadratic error between the coordinates ū and v̄ measured on the points Pp of the image 10 and the coordinates ¯u and ¯v of the projections °Pp, calculated by the preceding formulae (9), of the points °Pp. Uncertainties on the coordinates of the points Pp estimated by the modelling of the track 13 are taken into account (these uncertainties are represented by a matrix Λ of coefficients which can be estimated in advance). In other words, it is sought to minimize the quantity $C_{min}$ given by the following formula (10):

$$C_{\min}(R, t) = \sum_{i=1}^{n} \left( (\bar{u}_i, \bar{v}_i) - (\hat{\bar{u}}_i, \hat{\bar{v}}_i) \right)^T \Lambda^{-1} \left( (\bar{u}_i, \bar{v}_i) - (\hat{\bar{u}}_i, \hat{\bar{v}}_i) \right) \qquad (10)$$

Iterations are performed, each time moving the points °p according to the positions of their projections °Pp on the image 10, until these projections have converged sufficiently towards the centres Pp of the tracks 13. The location of the test object 1 being known in a fixed reference frame, it is then possible to know that of the video camera 4 in this same reference frame by calculating the inverse transformation.

Figure 6:
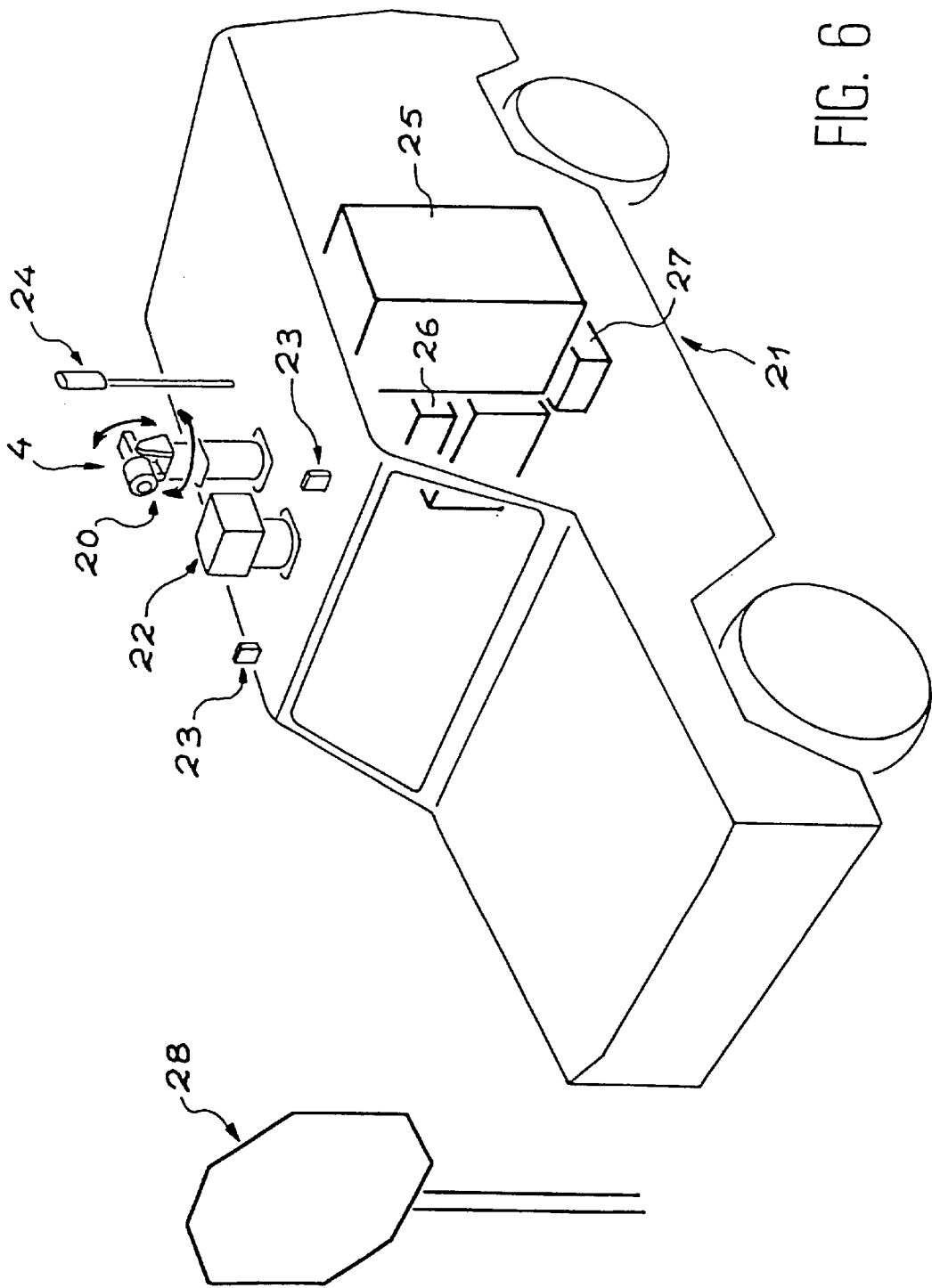
FIG. 6 illustrates a vehicle on which a location camera 22 or 4 is installed.

Here now is a concrete application of this location method. The location camera 4 can be disposed, as illustrated in FIG. 6, on a platform of a turret 20 perched on the roof of a vehicle 21 intended to record, while travelling on a road network, road traffic signs 28 in the service of the relevant administration or in order to compose databases which can be used for road navigation software programs which are starting to appear on the market. Another, fixed, location camera 22 is mounted directly on the roof of the vehicle 21. Both a high accuracy of location of the signs 28, of the order of around ten centimetres, and a complete recording, that is to say with no omission of signs 28, are required, although they have very variable forms and dimensions and they can be affected by dirt or tilting, they can be partially covered by foliage or other obstructions and their positions are sometimes unexpected. The vehicle 21 is consequently equipped with projectors 23, as well as a location antenna 24, situated on the roof; it is also provided, in the passenger compartment, with a control cabinet 25 which contains a computer and software for calculation and control, as well as a gyroscopic inertial unit 26 and at least one odometer 27. These elements known per se are not depicted in detail, but the odometer 27 can comprise a means of measuring the rotation of at least one of the wheels of the vehicle 21. The camera 22 for detecting the reflective signs, or the camera 4 for detecting the coloured signs, the antenna 24, the inertial unit 26 and the odometer 27 are connected to the control cabinet 25.

It will first be explained briefly how the signs 28 are detected. For this, use is made of the camera 22, sensitive to near infrared, and the projectors 23 for detecting the reflective signs, and/or the camera 4 for Selecting the coloured signs. Although other methods are possible, a camera 4 is chosen whose images are processed in two different ways by as many parallel measuring chains. Images of the environment taken in the visible spectrum are first of all broken down into three images, each of which comprises only one of the fundamental colours (red, green and blue) of the recorded scene. The signs 28 are recognized by their particular geometric forms and then identified by virtue of this form and by their colours by dedicated software programs which are not the object of the invention, and certain of which also read the inscriptions they carry. The other measuring route makes it possible to simultaneously take images of the scene in the near infrared: the projectors 23 emit such a light, which has the advantage of being invisible to other users, to the front of the vehicle 21, and this light is reflected by the signs 28 towards the camera 22. There is thus an additional means of making a complete recording. The images of the camera 22 in the near infrared are simpler to process since they are monochrome.

The antenna 24 receives location information from a network of satellites in circular orbit which make it possible to locate, in a known manner, the vehicle to the desired accuracy at the end of short and regular periods, of a few seconds. A so-called differential PGS location method is used to obtain the desired accuracy. The lengths of the movements of the vehicle 21 are measured in the interval by the odometer 27, and its changes in direction are measure by the inertial unit 26. The odometer 27 and the inertial unit 26 are subject to a drift which is relatively larger but which does not have time to really appear between two locations of the satellites with the antenna 24.

They thus make it possible to obtain a high location accuracy in the short term and with a high repetition speed (50 Hertz), which makes it possible to accurately calculate the position of the camera at the time of each shot and to compensate for the loss of the signal from a GPS satellite depending on obstructions.

This known technique of hybridization, GPS and inertia, can be used later when the recordings made on assignment are analyzed. It can advantageously be supplemented by the technique of matching the path of the vehicle and the digital map background (map matching).

Figure 7:
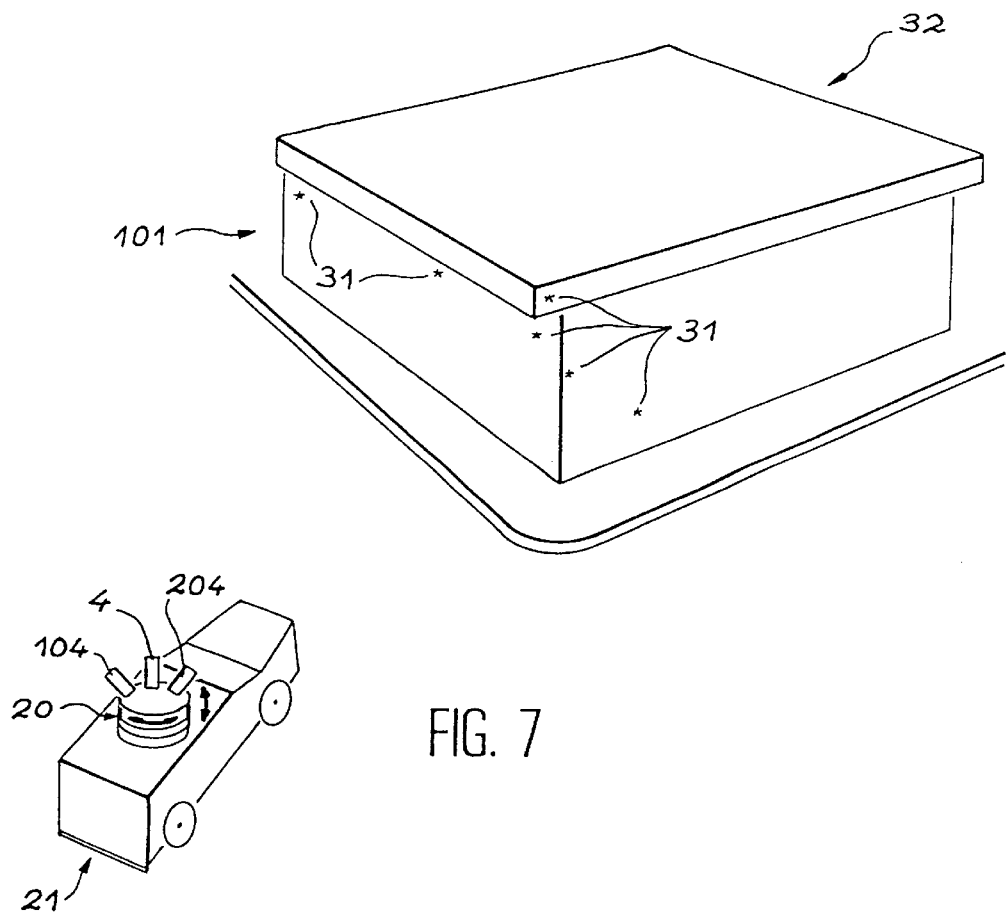
FIG. 7 illustrates the method of location of the camera or cameras by the test object in this application.

The uncertainties inherent in this method of locating signs 28 therefore essentially result from the orientation of the vehicle 21 on the ground and the orientation of the location cameras 4 and 22 on the turret 20 and the vehicle 21. It is in accordance with the invention to apply the method previously disclosed of locating the position of a camera by a fixed test object in the manner evoked in FIG. 7: the test object, here referenced by 101, can consist of a group of reflectors 31 stuck to the walls of a building 32 in front of which the vehicle 21 must pass periodically, such as a garage where it returns after its assignments. Setting out again for the next assignment, it is sufficient to stop the vehicle 21 for a moment in front of the building 32 and orient the location camera 22 by manoeuvring the vehicle, or the location camera 4 by orienting the turret 20, towards the reflectors 31 in order to take an image of the test object 101 which is analyzed in the manner which has been described, in order to deduce therefrom the extrinsic parameters of the location camera 4, expressed by the quantities t and R. The position and orientation of the location camera 4 are then determined in a fixed reference frame and then remain known at any instant of the journey, and notably when the images of the signs 28 are taken, by measuring the rotational movements of the turret 20 and the changes in direction of the vehicle 21 by the inertial unit 26, and its movements by the odometer 27 and the location system. It is therefore certain that it will be possible to calculate, with the desired accuracy, the position of the signs 28 at the surface of the ground. If, in accordance with a particular embodiment of the invention, a number of other location cameras such as 104 or 204 are mounted on the same turret 20 or possibly a neighbouring and similar turret in order for these also to take images of the signs 28, these additional cameras 104 and 204 are located at the same time with respect to the test object 101.

The set of cameras in effect has a large field of view and makes it possible to monitor the sign 28 by images taken successively by different cameras, which makes it possible to turn more slowly the turret 20 on which all the cameras are mounted, or even to keep it still. The invention is moreover wholly applicable to implementations without a turret 20, where the camera or cameras are directly mounted on the mobile support such as the vehicle 21.

Location of the signs 28 can be carried out by a number of known methods other than that of the application 96 06749 to which reference is made for the description of this particular location method. Some are described in "Three dimensional computer vision. A geometric viewpoint" by Faugeras (The MIT Press, 1993), "Photogrammetry Fundamentals and standard process" by Kraus (Bonn, Fred. Dümmler Verlag, 1993, 4th edition), or "3D dynamic scene analysis: a stereo based approach", by Zhang and Faugeras (Springer-Verlag, 1992). If the object carries marks with known relative positions, its position can even be calculated by applying to it the location method used with the test object.

Figure 8:
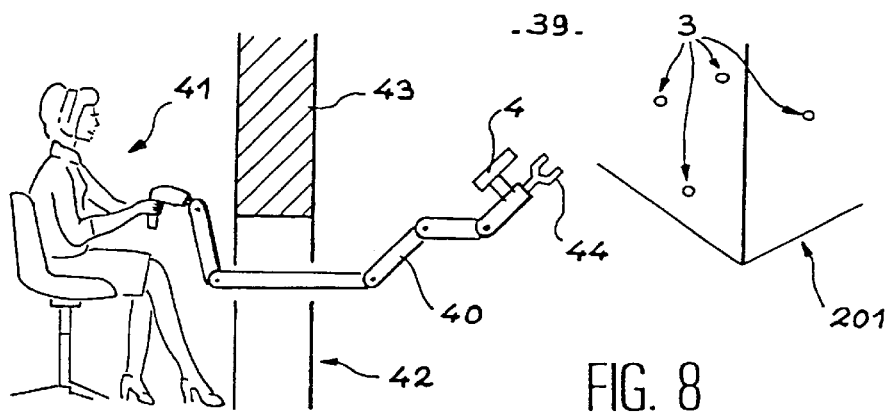
FIG. 8 illustrates another application of the invention.

Another application based on an identical location principle is explained with the help of FIG 8. A remote manipulation device 40 is controlled by an operator 41 situated behind a thick protective wall 42 which isolates him from the dangerous environment, either radioactive or some other, of a closed chamber 39. He can observe only a small volume through the thick pane of a window 43 and therefore has difficulties in placing an end claw 44 of the arm of the remote manipulation device 40 in the desired position. If, however, a camera 4 identical to the preceding ones is mounted on the remote manipulation device, close to the claw 44, to give a three-dimensional image of the environment around the claw 44 by image analyses similar to those which were carried out for the signs 28, it can periodically perform locations of the camera 4 by taking an image of a test object 201 which can be formed, like the test object 1 mentioned previously, by at least four circular marks 3 painted on a wall without extending into a common plane. Analysis of the image by the camera 4 makes it possible to subsequently know the exact position of the elements of the environment, which makes it possible to direct, without trial and error, the claw 44 to the desired positions by controlling its movements. The claw 44 can carry out precision work, like taking hold of an object, putting it down beside another or holding and placing a welding torch exactly at the join of plates placed side by side to be welded, even at out-of-the-way places of the chamber 39. It is necessary to note that the cameras 4 disposed at the end or such remote manipulation devices 40 must be replaced frequently owing to the hostile environment which quickly damages them, and that each time they are mounted in a different position, which complicates the learning of the remote manipulation device 40. A location of the test object 201 is therefore carried out each time the camera 4 is changed.

Another application of the principle of locating the position of a camera makes use of the possibility of calibrating the respective position of a number of cameras mounted on a mobile head. It concerns checking the geometry of vehicles (wheel alignment) in a motor vehicle inspection centre (of FIG. 9). The device consists of equipping the wheels 56 of the vehicle to be checked 55 with plates 54 carrying reflective marks 57, two cameras 51 and 52 then being placed on either side and in front of the vehicle. A known technique of three-dimensional location of the plates appearing in the field of each camera makes it possible to accurately determine the angular position of each wheel 56 with respect to the camera 51 or 52. It is therefore possible to determine whether the two wheels 56 of one and the same side of the vehicle are parallel since the check plates are then in the field of the same camera 51 or 52 which provides the reference frame.

In order to check the alignment of opposite wheels on one and the same axle, it is necessary to know accurately the reference frame transformation between the two cameras. A first device would consist of rigidly fixing the two cameras 51 and 52 to a transverse support and calibrating the position of the cameras 51 and 52 using the technique of this patent. It would be necessary to dispose a test object carrying marks in the field of the two cameras in order to know the position of each camera in the reference frame of this test object, and by difference, the positional transformation between the two cameras 51 and 52.

This vehicle geometry checking device would require a rigid and stable mechanical implementation, which will be heavy to install and bulky.

Figure 9:
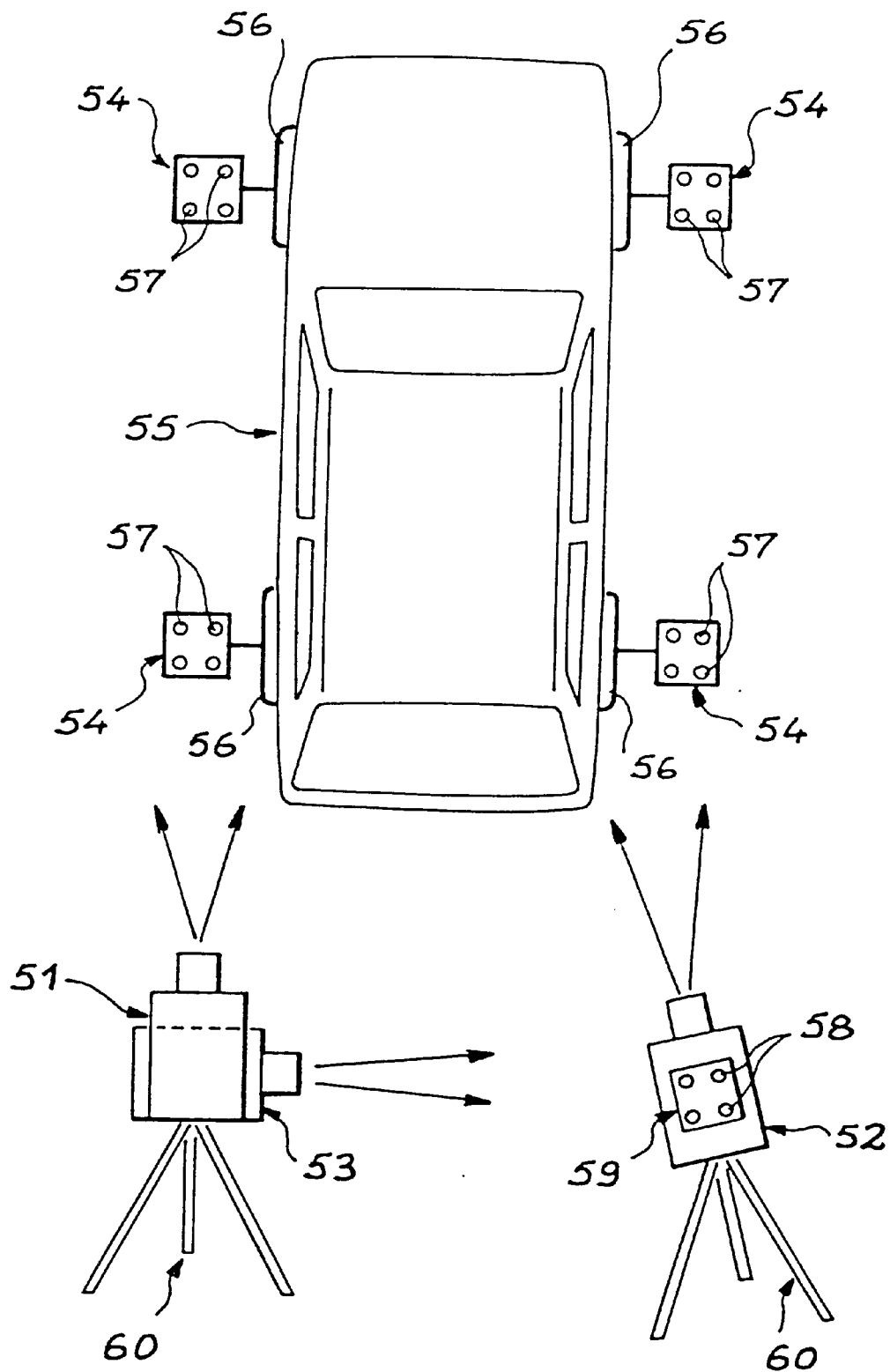
FIG. 9 illustrates another way of using the method.

Advantageously according to the device of FIG. 9, the two cameras 51 and 52 can be installed on either side of the vehicle on lightweight and dependent supports 60 (tripods). The camera 52 is equipped with a plate 59 carrying marks 58 oriented towards the camera 51, and a third camera 53 is firmly attached to the support of the camera 51 and oriented towards the camera 52.

The use of the technique of this patent analyzing the images of the plate 59 obtained by the camera 3 makes it possible to know continuously (at each alignment measurement) the actual position of the camera 53 with respect to the plate 59. The two items of equipment: the camera 51 associated with the camera 53 on the one hand and the camera 52 and its plate 59 carrying marks 58 on the other hand, are calibrated beforehand in the factory with the help of a measuring bench equipped with another camera and an associated test object in order to accurately know their fixed geometric parameters.

Thus, with this lightweight device, it will be possible to have the reference frame transformation between the camera 51 and the camera 52 necessary for checking the alignment of the four wheels of the vehicle in real time on the inspection site whatever the approximate position in which the operator has placed the tripods 60.

Utilization of the images taken by the calibration camera 53 is carried out in the same way as previously and makes it possible to deduce the relative position and orientation of the cameras 51 and 52.

Such a method could be generalized to any system comprising a number of cameras observing one and the same object, or neighbouring portions of one and the same object or one and the same space, and the views of which must be correlated with one another in order to place them side by side and reconstruct the object or deduce characteristics of the observed space.

What is claimed is:

1. A method of calibrating the original position and orientation of a camera disposed on a mobile support in an environment, comprising:

providing the environment with a test object at a known position and orientation;

taking an image of the test object with the camera;

analyzing the image of the test object with a processing system by reading positions of tracks (Pp) of characteristic marks of the test object on the image and deducing directions and distances between the characteristic marks and the camera, and then a position and an orientation of the camera with respect to the test object; and deducing the directions and distances between the characteristic marks and the calibration camera by carrying out a retro-projection of the centers of the tracks of the characteristic marks of the test object first on to a plane (II) passing through the origin of the test object reference frame and parallel to the plane of the image along lines converging towards a single focus (F), then in space, perpendicular to the said parallel plane in order to obtain retro-projection points (° P) on to the plane of the image along lines converging towards the focus (F) in order to obtain projection points (° Pp) , and a positional correction of the retro-projection points in order to minimize an error estimation criterion between coordinates of the centers of the tracks (Pp) of the characteristic marks and the projection points (° pp).

2. A method for calibrating the original position and orientation of a first camera disposed on a mobile support in an environment with respect to a second camera, the cameras being disposed on independent supports mobile in the environment, the method comprising:

providing the first camera with a calibration camera and the second camera with a test object at a known position and orientation;

taking an image of the test object with the calibration camera;

analyzing the image of the test object with a processing system by reading position of tracks (Pp) of characteristic marks of the test object on the image;

deducing directions and distances between the characteristic marks and the calibration camera, then a position and an orientation of the calibration camera with respect to the test object, and then of the first camera with respect to the second camera, wherein the directions and distances between the characteristic marks and the calibration camera are deduced by carrying out a retro-projection of the centers of the tracks of the characteristic marks of the test object first on to a plane (II) passing through the origin of the test object reference frame and parallel to the plane of the image along lines converging towards a single focus (F), then in space, perpendicular to the said parallel plane in order to obtain retro-projection points (° P), and then, iteratively, a projection of the retro-projection points (° P) on to the plane of the image along lines converging towards the focus (F) in order to obtain projection points (° Pp) , and a positional correction of the retro-projection points in order to minimize an error estimation criterion between coordinates of the centers of the tracks (Pp) of the characteristic marks and die projection points (° Pp).

3. A method for calibrating the original position and orientation of a first camera disposed on a mobile support in an environment with respect to a second camera, the cameras being disposed on independent supports mobile in the environment, the method comprising:

providing the first camera with a calibration camera and the second camera with a test object at a known position and orientation;

taking an image of the test object with the calibration camera;

analyzing the image of the test object with a processing system by reading position of tracks (Pp) of characteristic marks of the test object on the image;

deducing directions and distances between the characteristic marks and the calibration camera, then a position and an orientation of the calibration camera with respect to the test object, and then of the first camera with respect to the second camera, wherein the test object comprises at least three marks in the field of the camera to be calibrated, wherein the directions and distances between the characteristics marks and the calibration camera are deduced by carrying out a retro-projection of the centers of the tracks of the characteristic marks of the test object first on to a plane (II) passing through the origin of the test object reference frame and parallel to the plane of the image along lines converging towards a single focus (F), then in space, perpendicular to the said parallel plane in order to obtain retro-projection points (° P), and then, iteratively, a projection of the retro-projection points (° P) on to the plane of the image along lines converging towards the focus (F) in order to obtain projection points (° Pp) , and a positional correction of the retro-projection points in order to minimize an error estimation criterion between coordinates of the centers of the tracks (Pp) of the characteristic marks and The projection points (° Pp).

4. A method for calibrating the original position and orientation of a first camera disposed on a mobile support in an environment with respect to a second camera, the cameras being disposed on independent supports mobile in the environment, the method comprising:

providing the first camera with a calibration camera and the second camera with a test object at a known position and orientation;

taking an image of the test object with the calibration camera;

analyzing the image of the test object with a processing system by reading position of tracks (Pp) of characteristic marks of the test object on the image;

deducing directions and distances between the characteristic marks and the calibration camera, then a position and an orientation of the calibration camera with respect to the test object, and then of the first camera with respect to the second camera, wherein the position and the orientation of the calibration camera with respect to the test object are deduced in the form of a position (t) and an orientation (R) of the camera to be calibrated with respect to a reference frame related to the test object, wherein the directions and distances between the characteristic marks and the calibration camera are deduced by carrying out a retro-projection of the centers of the tracks of the characteristic marks of the test object first on to a plane (II) passing through the original of the test object reference frame and parallel to the plane of the image along lines converging towards a single focus (F), then in space, perpendicular to the said parallel plane in order to obtain retro-projection points (° P), and then, iteratively, a projection of the retro-projection points (° P) on to the plane of the image along lines converging towards the focus (F) in order to obtain projection points (° Pp), and a positional correction of the retro-projection points in order to minimize an error estimation criterion between coordinates of the centers of the tracks (Pp) of the characteristic marks and the projection points (° Pp).

* * * * *